(12) United States Patent
Allan

(10) Patent No.: US 10,904,136 B2
(45) Date of Patent: Jan. 26, 2021

(54) MULTICAST DISTRIBUTION TREE VERSIONING FOR MINIMIZING MULTICAST GROUP TRAFFIC DISRUPTION

(71) Applicant: Telefonaktiebolaget LM Ericsson (publ), Stockholm (SE)

(72) Inventor: David Ian Allan, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 298 days.

(21) Appl. No.: 16/056,398

(22) Filed: Aug. 6, 2018

(65) Prior Publication Data

US 2020/0044957 A1    Feb. 6, 2020

(51) Int. Cl.
*H04L 12/761* (2013.01)
*H04L 12/753* (2013.01)

(52) U.S. Cl.
CPC .............. *H04L 45/16* (2013.01); *H04L 45/48* (2013.01)

(58) Field of Classification Search
CPC ....................................................... H04L 45/16
See application file for complete search history.

(56) References Cited

U.S. PATENT DOCUMENTS

| | | |
|---|---|---|
| 6,778,531 B1 | 8/2004 | Kodialam et al. |
| 6,798,739 B1 | 9/2004 | Lee |
| 6,857,012 B2 | 2/2005 | Sim et al. |
| 7,310,335 B1 | 12/2007 | Garcia-Luna-Aceves et al. |
| 7,830,787 B1 * | 11/2010 | Wijnands .............. H04L 47/122 370/218 |

(Continued)

FOREIGN PATENT DOCUMENTS

| | | |
|---|---|---|
| CN | 102142970 B | 12/2013 |
| EP | 2940938 A1 | 11/2015 |

(Continued)

OTHER PUBLICATIONS

Lei ;X Fu; D Hogrefe : Univ Goettingen J: "DMMP: Dynamic Mesh-based Overlay Multicast Protocol; draft-lei-samrg-dmmp-03. txt"; IETF; StandardWorkingDraft, No. 3, Feb. 22, 2008, XP015054241) (Year: 2008).*

(Continued)

*Primary Examiner* — Kodzovi Acolatse
*Assistant Examiner* — Abdeltif Ajid
(74) *Attorney, Agent, or Firm* — NDWE, LLP

(57) ABSTRACT

A method is implemented by a network device to minimize multicast traffic loss or duplication in response to an update to multicast group membership in a network where multicast group membership changes can disrupt multicast traffic delivery to other members of the multicast group. The method receives a registration for the multicast group including a member since version number that is greater than the version number currently advertised by the root for a multicast distribution tree (MDT) that serves the multicast group. The root advertises a new MDT identifier (ID) with a new version number for the MDT that serves the multicast group in the network, and switches distribution of multicast group traffic from the current version of the MDT that serves the multicast group to the new version of the MDT that serves the multicast group after a pre-determined time.

20 Claims, 10 Drawing Sheets

(56) References Cited

U.S. PATENT DOCUMENTS

| | | |
|---|---|---|
| 8,005,081 B2 | 8/2011 | Bragg et al. |
| 8,121,056 B1 | 2/2012 | Aggarwal et al. |
| 8,223,668 B2 | 7/2012 | Allan et al. |
| 8,307,422 B2 | 11/2012 | Varadhan et al. |
| 8,310,957 B1 | 11/2012 | Rekhter et al. |
| 8,488,603 B2 | 7/2013 | Zha et al. |
| 8,611,359 B1 | 12/2013 | Kompella et al. |
| 8,811,388 B2 | 8/2014 | Fedyk |
| 8,867,367 B2 | 10/2014 | Allan |
| 8,953,590 B1 | 2/2015 | Aggarwal et al. |
| 9,112,848 B2 | 8/2015 | Allan |
| 9,430,262 B1 | 8/2016 | Felstaine et al. |
| 9,794,148 B1 | 10/2017 | Ramachandran et al. |
| 9,954,765 B2 | 4/2018 | Allan |
| 10,069,639 B2 | 9/2018 | Bragg et al. |
| 10,164,907 B2 | 12/2018 | Allan |
| 2003/0085931 A1 | 5/2003 | Card et al. |
| 2003/0176931 A1 | 9/2003 | Pednault et al. |
| 2006/0215588 A1 | 9/2006 | Yoon |
| 2006/0221867 A1 | 10/2006 | Wijnands et al. |
| 2006/0268871 A1 | 11/2006 | Van Zijst |
| 2007/0133568 A1 | 6/2007 | Qing et al. |
| 2007/0140107 A1 | 6/2007 | Eckert et al. |
| 2007/0147372 A1 | 6/2007 | Liu et al. |
| 2007/0171851 A1 | 7/2007 | Beckmann et al. |
| 2007/0189193 A1 | 8/2007 | Previdi et al. |
| 2008/0144644 A1 | 6/2008 | Allan et al. |
| 2008/0279101 A1 | 11/2008 | Wu et al. |
| 2008/0298360 A1 | 12/2008 | Wijnands et al. |
| 2009/0201803 A1 | 8/2009 | Filsfils et al. |
| 2009/0245255 A1 | 10/2009 | Cao et al. |
| 2009/0310538 A1 | 12/2009 | Lee et al. |
| 2010/0002697 A1 | 1/2010 | Krishnan et al. |
| 2010/0020797 A1 | 1/2010 | Casey et al. |
| 2010/0281106 A1 | 11/2010 | Ashwood-Smith |
| 2010/0316056 A1 | 12/2010 | Unbehagen et al. |
| 2011/0170403 A1 | 7/2011 | Ashwood-Smith et al. |
| 2011/0202761 A1 | 8/2011 | Sarela et al. |
| 2011/0228780 A1 | 9/2011 | Ashwood-Smith et al. |
| 2011/0273980 A1 | 11/2011 | Ashwood Smith |
| 2011/0299427 A1 | 12/2011 | Chu et al. |
| 2011/0305239 A1 | 12/2011 | Chandrashekharachar |
| 2012/0063451 A1 | 3/2012 | Keesara et al. |
| 2012/0063465 A1 | 3/2012 | Keesara et al. |
| 2012/0075988 A1 | 3/2012 | Lu et al. |
| 2012/0106347 A1 | 5/2012 | Allan et al. |
| 2012/0147885 A1 | 6/2012 | Johri et al. |
| 2012/0177041 A1 | 7/2012 | Berman |
| 2012/0177042 A1 | 7/2012 | Berman |
| 2012/0177043 A1 | 7/2012 | Berman |
| 2012/0201539 A1 | 8/2012 | Boertjes et al. |
| 2012/0233350 A1 | 9/2012 | Unbehagen et al. |
| 2012/0300774 A1 | 11/2012 | Casey et al. |
| 2013/0010790 A1* | 1/2013 | Shao ............... H04L 45/16 370/390 |
| 2013/0114466 A1 | 5/2013 | Koponen et al. |
| 2013/0114595 A1 | 5/2013 | Mack-Crane et al. |
| 2013/0142511 A1 | 6/2013 | Spraggs et al. |
| 2013/0195111 A1 | 8/2013 | Allan et al. |
| 2013/0259046 A1 | 10/2013 | Ramesh |
| 2014/0036913 A1 | 2/2014 | Olofsson et al. |
| 2014/0064063 A1 | 3/2014 | Holness et al. |
| 2014/0086097 A1 | 3/2014 | Qu et al. |
| 2014/0092898 A1 | 4/2014 | Berman |
| 2014/0112188 A1 | 4/2014 | Keesara et al. |
| 2014/0126422 A1 | 5/2014 | Bragg |
| 2014/0211797 A1 | 7/2014 | Luo et al. |
| 2014/0241351 A1 | 8/2014 | Kollipara et al. |
| 2014/0241352 A1 | 8/2014 | Kollipara et al. |
| 2014/0254592 A1 | 9/2014 | Olofsson et al. |
| 2014/0376366 A1 | 12/2014 | Li et al. |
| 2015/0156106 A1 | 6/2015 | Allan |
| 2015/0188771 A1 | 7/2015 | Allan et al. |
| 2015/0319007 A1 | 11/2015 | Allan |
| 2015/0358226 A1 | 12/2015 | Liu |
| 2016/0028625 A1 | 1/2016 | Hari et al. |
| 2016/0277291 A1 | 9/2016 | Lakshmikanthan et al. |
| 2016/0308793 A1 | 10/2016 | Levy-Abegnoli et al. |
| 2017/0012880 A1 | 1/2017 | Yang |
| 2017/0078188 A1 | 3/2017 | Allan |
| 2017/0093612 A1 | 3/2017 | Singh et al. |
| 2017/0093689 A1 | 3/2017 | Manur et al. |
| 2018/0324090 A1 | 11/2018 | Duncan et al. |
| 2019/0020598 A1 | 1/2019 | Allan |
| 2019/0116053 A1 | 4/2019 | Allan |

FOREIGN PATENT DOCUMENTS

| | | |
|---|---|---|
| WO | 2014139564 A1 | 9/2014 |
| WO | 2017/118941 A1 | 7/2017 |
| WO | 2017/144943 A1 | 8/2017 |
| WO | 2017/144944 A1 | 8/2017 |
| WO | 2017/144945 A1 | 8/2017 |
| WO | 2017/144946 A1 | 8/2017 |
| WO | 2017/144947 A1 | 8/2017 |
| WO | 2017/168203 A1 | 10/2017 |
| WO | 2017/168204 A1 | 10/2017 |

OTHER PUBLICATIONS

Lei et al., "DMMP: Dynamic Mesh-based Overlay Multicast Protocol, draft-lei-samrg-dmmp-03.txt", Network Working Group, Internet-Draft, Feb. 22, 2008, pp. 1-30.

Allan, et al., "A Framework for Computed Multicast applied to MPLS based Segment: draft-allan-spring-mplsmulticast-framework-OO.txt," Spring Working Group, Feb. 23, 2016, pp. 1-13.

Allen, et al., "802.1aq and 802.1Qbp Support over EVPN; draft-allan-12vpn-spbm-evpn-00.txt," IETF, Standard Working Draft, ISOC, Jul. 9, 2012, pp. 1-11.

Non-Final Office Action from U.S. Appl. No. 14/850,787, dated Mar. 20, 2019, 35 pages.

Aggarwal, et al. "BGP MPLS Based Ethernet VPN, draft-raggarwa-sajassi-l2vpn-evpn-04.txt", Internet Engineering Task Force (IETF), Network Working Group, Internet-Draft, Sep. 12, 2011, 43 pages.

Aggarwal, et al., "BGP Encodings and Procedures for Multicast in MPLS/BGP IP VPNs," BGP Encodings and Procedures for Multicast in MPLS/BGP IP VPNs; RFC6514; Internet Engineering Task Force; IETF, Feb. 2012, pp. 1-59.

Allan, et al., "Shortest Path Bridging, MAC Mode Support over EVPN, draft-ietf-bess-spbm-evpn-02," Internet Engineering Task Force (IETF), BESS Working Group, Internet-Draft, Oct. 2015, 11 pages.

Bhaskar, et al., "Bootstrap Router (BSR) Mechanism for Protocol Independent Multicast (PIM); rfc5059.txt," 5. JCT-VC Meeting; 96. MPEG Meeting; Mar. 16, 2011-Mar. 23, 2011; Geneva; (Joint Collaboartive Team on Video Coding of ISO/IEC JTC1/SC29/WG11 and ITU-T SG.16); URL: http://wftp3.itu.int/av-arch/jctvc-site, Internet Engineering Task Force, IETF, CH, Jan. 1, 2008 (Jan. 1, 2008), XP015055131, ISSN: 0000-0003, Complete chapter "1. Introduction"; p. 3-p. 8.

Boudani, et al., "An Effective Solution for Multicast Scalability: The MPLS Multicast Tree (MMT)—draft-boudani-mpls-multicast-tree-06.txt," Internet Draft, Oct. 2004, 21 pages.

Cheng, et al., "IGP Multicast Architecture," draft-yong-pim-igp-multicast-arch-01, IETF, Mar. 9, 2015, pp. 1-15.

Dalal, et al., "Reverse Path Forwarding of Broadcast Packets," Communications of the ACM, Dec. 1978, vol. 21 (12), pp. 1040-1048.

Farkas, et al., "IS-IS Path Computation and Reservation, draft-ieft-isis-pcr-02," Internet Engineering Task Force (IETF), IS-IS for IP Internets, Internet-Draft, Sep. 18, 2015, 32 pages.

Filsfils, et al., "Segment Routing Architecture," draft-ietf-spring-segment-routing-07.txt, IETF, ISOC, Dec. 15, 2015, pp. 1-24.

Filsfils, et al., "Segment Routing with MPLS data plane, draft-ietf-spring-segment-routing-mpls-01," Network Working Group, Internet-Draft, May 29, 2015, 14 pages.

Filsfils, et al., "Segment Routing with MPLS data plane, draft-ietf-spring-segment-routing-mpls-02," Network Working Group, Internet-Draft, Oct. 17, 2015, 14 pages.

(56) References Cited

OTHER PUBLICATIONS

Filsfils, et al., "Interconnecting Millions of Endpoints With Segment Routing, draft-filsfils-spring-large-scale-interconnect-00," Internet Engineering Task Force (IETF), IETF Trust, Network Working Group, Internet-Draft, Jul. 19, 2015, 10 pages.

Hao, et al., "IGP Multicast Architecture," draft-yong-rtgwg-igp-multicast-arch-01.txt, IETF, ISOC, Nov. 2014, pp. 1-14.

IEEE P802.1aq/D4.6, Draft Standard for Local and Metropolitan Area Networks—, Media Access Control (MAC) Bridges and Virtual Bridged Local Area Networks—Amendment XX: Shortest Path Bridging, Feb. 10, 2012, 363 pages.

IEEE Std 802.1Qca/D2.1: "Draft Standard for Local and Metropolitan Area Networks—Bridges and Bridged Networks—Amendment: Path Control and Reservation," IEEE Computer Society, Jun. 23, 2015, 114 pages.

Kini, et al., "Entropy labels for source routed stacked tunnels, draft-ietf-mpls-spring-entropy-label-00," Internet Engineering Task Force (IETF), Network Working Group, Internet-Draft, Mar. 5, 2015, 12 pages.

Li, et al., "Merging Source and Shared Trees Multicast in MPLS Networks," PDCAT, Seventh International Conference, Dec. 1, 2006, pp. 23-28.

Media Access Control (MAC) Bridges and Virtual Bridged Local Area Networks Amendment 20: Shortest Path Bridging, IEEE Standard for Local and metropolitan area networks, IEEE Computer Society, IEEE Std 802.1 aq, New York, NY., Jun. 29, 2012, 340 pages.

Previdi, et al., "SPRING Problem Statement and Requirements," draft-ietf-spring-problem-statement-07.txt, IETF, ISOC, Mar. 1, 2016, pp. 1-18.

Rabadan, et al., "Usage and applicability of BGP MPLS based Ethernet VPN—draft-ietf-bess-evpn-usage-01.txt," Internet Engineering Task Force (IETF), Internet Society, Jul. 4, 2015, 30 pages.

RFC 3031: Rosen, et al., "Multiprotocol Label Switching Architecture," Request for Comments: 3031, Jan. 2001, 61 pages.

RFC 3209: Awduche, et al., "RSVP-TE: Extensions to RSVP for LSP Tunnels," Network Working Group, the Internet Society, Request for Comments: 3209, Dec. 2001, 61 pages.

RFC 3353: Ooms, et al., "Overview of IP Multicast in a Multi-Protocol Label Switching (MPLS) Environment," Request for Comments: 3353, Aug. 2002, 30 pages.

RFC 3813: Srinivasan, et al., "Multiprotocol Label Switching (MPLS) Label Switching Router (LSR) Management Information Base (MIB)," Request for Comments: 3813, Jun. 2004, 60 pages.

RFC 4364: Rosen, et al., "BGP/MPLS IP Virtual Private Networks (VPNs)," the Internet Society, Network Working Group, Request for Comments: 4364, Feb. 2006, 47 pages.

RFC 5015: Handley, et al., "Bidirectional Protocol Independent Multicast (BIDIR-PIM)," Network Working Group, Request for Comments: 5015, Oct. 2007, 43 pages.

RFC 5036: Andersson, "LDP Specification," the EITF Trust, Network Working Group, Request for Comments: 5036, Oct. 2007, 135 pages.

RFC 6329: Fedyk, et al., "IS-IS Extensions Supporting IEEE 802.1aq Shortest Path Bridging," Internet Engineering Task Force (IETF), Request for Comments: 6329, Apr. 2012, 38 pages.

RFC 6388: Wijnands, et al. "Label Distribution Protocol Extensions for Point-to-Multipoint and Multipoint-to-Multipoint Label Switched Paths," Internet Engineering Task Force (IETF), Request for Comments: 6388, Nov. 2011, 39 pages.

RFC 6826: Wijnands, et al., "Multipoint LDP In-Band Signaling for Point-to-Multipoint and Multipoint-to-Multipoint Label Switched Paths," Internet Engineering Task Force (IETF), Request for Comments: 6826, Jan. 2013, 12 pages.

RFC 7734: Allan, et al., "Support for Shortest Path Bridging MAC Mode over Ethernet VPN (EVPN)," Internet Engineering Task Force (IETF), Request for Comments: 7734, IETF Trust, Jan. 2016, 11 pages.

Sajassi, et al., "PBB E-VPN, draft-sajassi-l2vpn-pbb-evpn-03.txt," Internet Engineering Task Force (IETF), Network Working Group, Internet-Draft, Oct. 28, 2011, 25 pages.

Aggarwal, et al., "BGP MPLS Based Ethernet VPN, draft-ietf-l2vpn-evpn-00," IETF Network Working Group Internet Draft, Feb. 24, 2012, 39 pages.

Sajassi, et.al., "PBB E-VPN, draft-ietf-l2vpn-pbb-evpn-02," IETF Trust, Internet Working Group, Internet Draft, Mar. 29, 2012, 27 pages.

U.S. Appl. No. 14/850, Published.

U.S. Appl. No. 15/076,546, U.S. Pat. No. 9,954,765, U.S. Appl. No. 62/276,739, Issued.

Filsfils, et al., "Interconnecting Millions of Endpoints With Segment Routing, draft-filsfils-spring-large-scale-interconnect-01," Internet Engineering Task Force (IETF), IETF Trust, Network Working Group, Internet-Draft, Nov. 1, 2015, 11 pages.

IEEE Std 802.1 ad-2005: "IEEE Standard for Local and Metropolitan Area Networks-Virtual Bridged Local Area Networks—Amendment 4: Provider Bridges," IEEE Computer Society, May 26, 2006, pp. 1-74.

IEEE Std 802.1ah-2008: "IEEE Standard for Local and metropolitan area networks—Virtual Bridged Local Area Networks; Amendment 7: Provider Backbone Bridges," IEEE Computer Society, Aug. 14, 2008, pp. 1-121.

Singh, D., "Yet another blog about Segment Routing—Part 1," Packet Pushers Interactive, LLC, Blog, Apr. 27, 2015, pp. 1-11.

Wikipedia, "Multiprotocol Label Switching," Nov. 6, 2017, pp. 1-7.

Wikipedia, "Tunneling protocol," Apr. 28, 2018, pp. 1-4.

Wikipedia, "Unicast," Sep. 11, 2017, 2 pages.

* cited by examiner

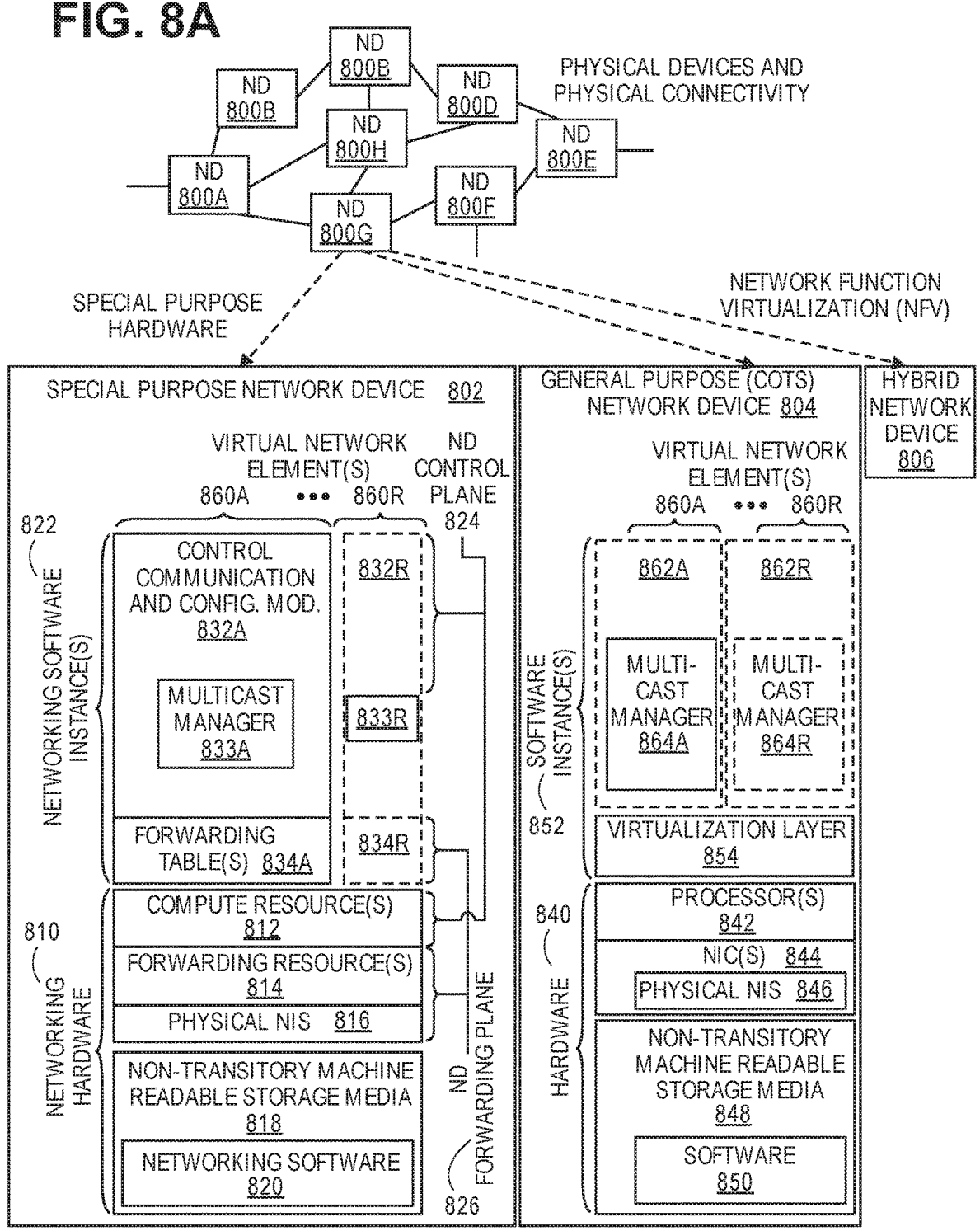

MULTICAST DISTRIBUTION TREE VERSIONING FOR MINIMIZING MULTICAST GROUP TRAFFIC DISRUPTION

TECHNICAL FIELD

Embodiments of the invention relate to the field of multicast routing in source packet in routing networking (SPRING) networks; and more specifically, to a method of reducing packet loss caused by updates to a multicast distribution tree (MDT).

BACKGROUND ART

Numerous techniques and protocols exist for configuring networks to handle multicast traffic. For Internet Protocol (IP) and/or multiprotocol label switching (MPLS) implementations the existing solutions for multicast are based on multicast label distribution protocol (mLDP) or protocol independent multicast (PIM). These are all techniques that depend on a unicast shortest path first (SPF) computation followed by handshaking between peers to sort out a loop free multicast distribution tree (MDT) for each multicast group and source. At the same time numerous protocols exist that provide for unicast tunneling, and some (such as label based architectures like source packet in routing (SPRING) or MPLS-LDP) implement a full mesh of unicast tunnels as an artifact for normal operation.

Shortest path bridging (SPB) is a protocol related to computer networking for the configuration of computer networks that enables multipath routing. In one embodiment, the protocol is specified by the Institute of Electrical and Electronics Engineers (IEEE) 802.1aq standard. This protocol replaces prior standards such as spanning tree protocols. SPB enables all paths in the network to be active with multiple equal costs paths being utilized through load sharing and similar technologies. The standard enables the implementation of logical Ethernet networks in Ethernet infrastructures using a link state protocol to advertise the topology and logical network memberships of the nodes in the network. SPB implements large scale multicast as part of implementing virtualized broadcast domains. A key distinguishing feature of the SPB standard is that the MDTs are computed from the information in the routing system's link state database via an all-pairs-shortest-path algorithm, which minimizes the amount of control messaging to converge multicast.

SPRING is a technology that utilizes MPLS technology whereby global identifiers are used in the form of a global label assigned per label switched route (LSR), which is used for forwarding packets to that LSR. Using SPRING, a full mesh of unicast tunnels can be constructed with every node in the SPRING network computing the shortest path to every other node and installing the associated global labels accordingly. In the case of SPRING, this also allows explicit paths to be set up via the application of label stacks at the network ingress. Encompassed with this approach is the concept of a strict (every hop specified) or loose (some waypoints specified) route across a network determine at an ingress node that is dependent on how exhaustively the ingress node specifies a path using an MPLS label stack.

Proposals have been made to use global identifiers in the dataplane combined with the IEEE 802.1aq technique of advertising multicast registrations in the interior gateway protocol (IGP) and replicating the "all pairs shortest path" approach of IEEE 802.1aq to compute MDTs without the additional handshaking. Such an approach would inherit a lot of desirable properties embodied in the IEEE 802.1aq approach, primarily in the simplification of the amount of control plane exchange required to converge the network.

However, the configuration of flat multicast trees in such networks using MPLS, SPB, SPRING and similar technologies can generate a significant amount of state, in particular in association with multicast source specific tree implementation of multicast groups. To implement a given multicast group it is necessary to install state to implement an MDT per multicast source. Less optimal solutions exist such as spanning trees or shared trees, but a tree per multicast source per multicast group provides for efficient, minimal latency multicast group traffic delivery.

It may be possible with a computed tree to utilize unicast tunneling in a SPRING or similar network to minimize the amount of state in the forwarding plane. However, simply applying the IEEE 802.1aq algorithms that compute a common "template" solution for all MDTs from a given source to the tunneled approach in a network that also implements equal cost multipath (ECMP) may result in multiple copies of a packet traversing a given interface. An algorithm that generates a minimum cost shortest path tree for each group served by each source would have the correct properties, but would be computationally prohibitive.

A multicast tree established in a distributed system via local computation that utilizes tunnels to bypass all nodes that are not roots, leaves and replication points and will not require more than one copy of multicast packet to traverse a link requires a unique solution for the tree topology that is a function of the root, the leaves and the network topology. A change to the network topology or the set of leaves can result in a significantly different arrangement of the multicast tree, including changes to where the replication nodes are located in a given network. Simple operational joins and leaves to a given tree whereby the tree is modified "in-service" may result in a substantially different layout and affect traffic distribution to the other members of the multicast group.

SUMMARY

In one embodiment, a method is implemented by a network device to minimize multicast traffic loss or duplication in response to an update to multicast group membership in a network where multicast group membership changes can disrupt multicast traffic delivery to other members of the multicast group. The method receives a registration for the multicast group including a member since version number that is greater than the version number currently advertised by the root for a multicast distribution tree (MDT) that serves the multicast group, or the registration for the multicast group including a member until version number that is less than or equal to the current version number of the MDT. When the member since version in the registration is higher than that currently advertised by the root, the root advertises a new MDT identifier (ID) with a new version number for the MDT that serves the multicast group in the network, and switches distribution of multicast group traffic from the current version of the MDT that serves the multicast group to the new version of the MDT that serves the multicast group after a pre-determined time.

In another embodiment, a network device is configured to minimize multicast traffic loss or duplication in response to an update to multicast group membership in a network where multicast group membership changes can disrupt multicast traffic delivery to other members of the multicast group. The network device including, a non-transitory computer readable storage medium having stored therein a multicast manager, and a processor coupled to the non-transitory computer readable storage medium, the processor to execute the multicast manager, the multicast manager to receive a registration for the multicast group including a member since version number that is greater than a current version number of a multicast distribution tree (MDT) that serves the multicast group or the registration for the multicast group including a member until version number that is less than or equal to the current version number of the MDT, to advertise a new MDT identifier (ID) with a new version number for the MDT that serves the multicast group in the network, and to switch distribution of multicast group traffic from the current version of the MDT that serves the multicast group to the new version of the MDT that serves the multicast group after a pre-determined time.

In a further embodiment, a computing device is in communication with a network device in a network with a plurality of network devices, the computing device to execute a plurality of virtual machines for implementing network function virtualization (NFV), wherein a virtual machine from the plurality of virtual machines is configured to minimize multicast traffic loss or duplication in response to an update to multicast group membership in a network where multicast group membership changes can disrupt multicast traffic delivery to other members of the multicast group. The computing device includes a non-transitory computer readable storage medium having stored therein a multicast manager, and a processor coupled to the non-transitory computer readable storage medium, the processor to execute the virtual machine from the plurality of virtual machines, the virtual machine to execute the multicast manager, the multicast manager to receive a registration for the multicast group including a member since version number that is greater than a current version number of a multicast distribution tree (MDT) that serves the multicast group or the registration for the multicast group including a member until version number that is less than or equal to the current version number of the MDT, to advertise a new MDT identifier (ID) with a new version number for the MDT that serves the multicast group in the network, and to switch distribution of multicast group traffic from the current version of the MDT that serves the multicast group to the new version of the MDT that serves the multicast group after a pre-determined time.

In one embodiment, a control plane device is configured to implement a control plane of a software defined networking (SDN) network including a network device in a network with a plurality of network devices, wherein the control plane device is configured to minimize multicast traffic loss or duplication in response to an update to multicast group membership in a network where multicast group membership changes can disrupt multicast traffic delivery to other members of the multicast group. The control plane device includes a non-transitory computer readable storage medium having stored therein a multicast manager, and a processor coupled to the non-transitory computer readable storage medium, the processor to execute the multicast manager, the multicast manager to receive a registration for the multicast group including a member since version number that is greater than a current version number of a multicast distribution tree (MDT) that serves the multicast group or the registration for the multicast group including a member until version number that is less than or equal to the current version number of the MDT, to advertise a new MDT identifier (ID) with a new version number for the MDT that serves the multicast group in the network, and to switch distribution of multicast group traffic from the current version of the MDT that serves the multicast group to the new version of the MDT that serves the multicast group after a pre-determined time.

BRIEF DESCRIPTION OF THE DRAWINGS

The invention may best be understood by referring to the following description and accompanying drawings that are used to illustrate embodiments of the invention. In the drawings:

FIG. 8A illustrates connectivity between network devices (NDs) within an exemplary network, as well as three exemplary implementations of the NDs, according to some embodiments of the invention.

FIG. 8B illustrates an exemplary way to implement a special-purpose network device according to some embodiments of the invention.

DETAILED DESCRIPTION

Figure 1:
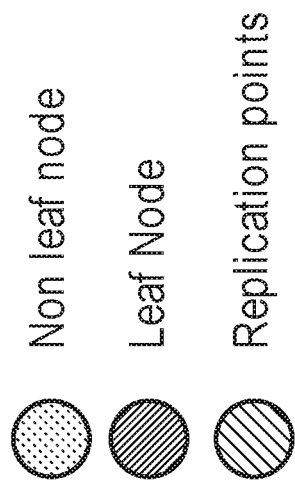
FIG. 1 is a diagram of one embodiment of a network in which an optimized multicast distribution tree (MDT) has been implemented in which multicast group traffic for that MDT would be disrupted by a multicast group membership change.
Figure 1:
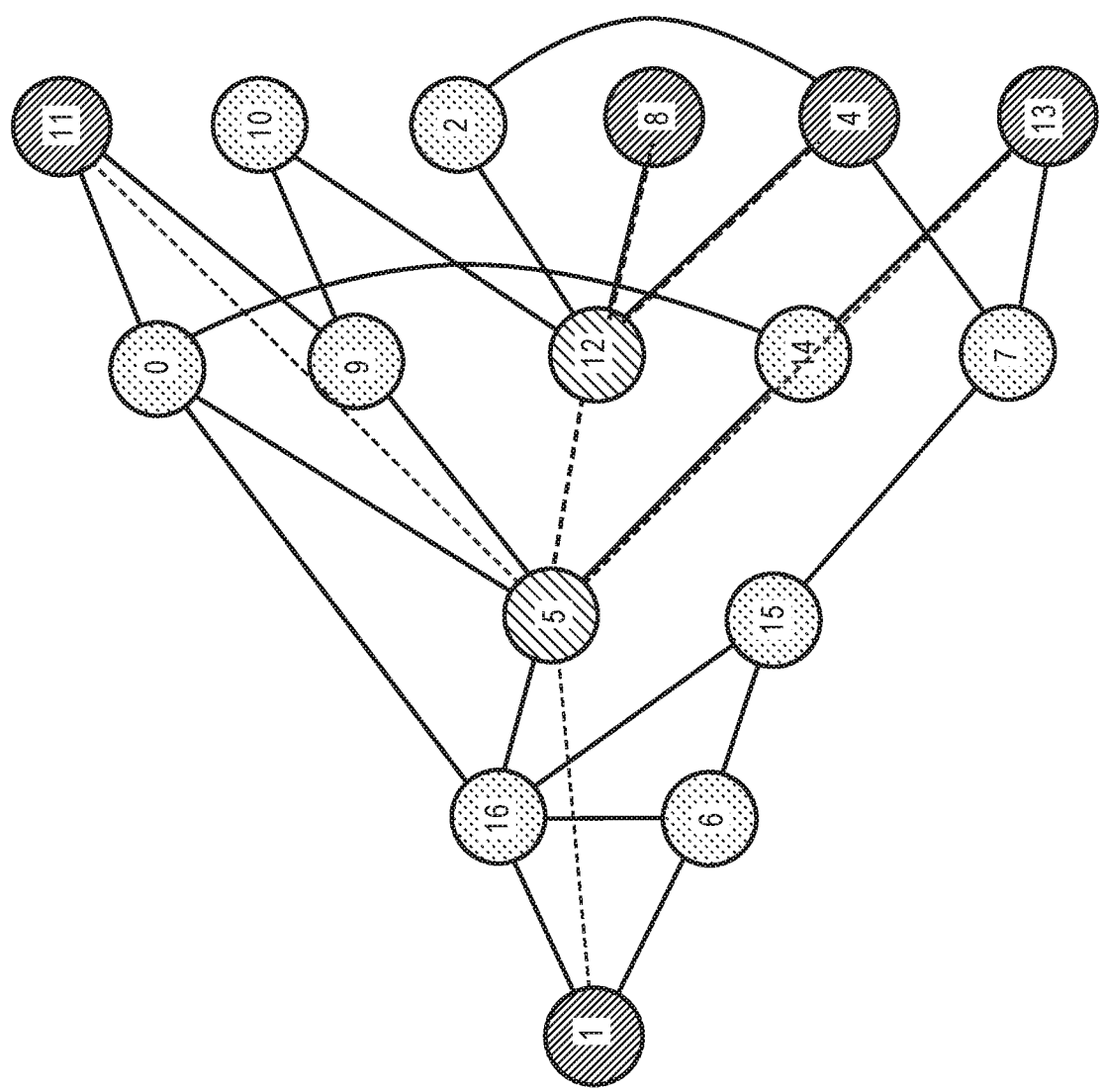

The following description describes methods and apparatus for reducing packet loss caused by updates to a multicast distribution tree (MDT) in a network that uses distributed computation to determine MDT layout. The embodiments are applicable to source packet in routing networking (SPRING) networks, in particular, where the MDTs in the SPRING network have been optimized to reduce state and redundant packet forwarding. However, the embodiments are also applicable to networks with similar conditions where MDT membership changes result in significant changes to the MDT layout and therefore disrupt packet delivery. The embodiments provide a mechanism to permit "in-service" modification of an MDT without affecting traffic delivery to uninvolved recipients.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Terminology

Segment Routing (SR) Domain is a collection of SR capable devices in a network.

SR Path is route in the SR Domain that contains on or more SR Segments.

SR Segment (herein 'segment') connects two points (i.e., SR capable devices) in the SR domain. An SR Segment may traverse multiple routers/hops and is represented by a Segment Identifier (SID).

Multicast segment connects a root and one or more leaves in the SR domain.

SID is an identifier for an SR segment that can be local to a node or domain wide ('global'), which means that the SID is known within an SR Domain. A multicast SID is a special case of a SID that identifies a p2mp segment.

Unicast Tunnels are tunnels that are point to point (P2P) or multipoint to point (mp2p) tunnels. In the context of example SPRING networks unicast tunnels are utilized between nodes of the SPRING network that create an overlay on an underlying network to enable the specification of loose paths using multiprotocol labels swapping (MPLS) labels for the nodes that will traverse these unicast tunnels where each unicast tunnel can be a segment in the SPRING network.

FIG. 1 is a diagram of one embodiment of a network in which an optimized multicast distribution tree (MDT) has been implemented and in which multicast group traffic for that MDT can be disrupted by a multicast group membership change. In one example, tunnels are employed as an interconnect between any transit nodes (non-replicating and non-terminating) in the MDT. For example, the addition of node 10 as a leaf would require coordinated state changes at nodes 5 and 9 to produce a new optimal tree. The example of FIG. 1 and the MDT construction example provided in connection with FIG. 1 is provided by way of example and not limitation. One skilled in the art would understand that the principles and process of the embodiments of the present invention are also applicable to multicast in networks with differing distributed MDT construction algorithms.

In the example of FIG. 1, the tree construction algorithms specified in IEEE 802.1aq are utilized to produce a minimum cost shortest path tree, but this is only true in the scenario where every node in the network topology graph is a leaf. The prototype tree used in IEEE 802.1aq on a per Individual Service Identifier (I-SID) multicast distribution tree (MDT) basis is a MDT that is (S,*) and is minimum cost, but the individual (S,G) MDTs are not necessarily optimal. In this notation (S, *) is the set of MDTs with a source S reaching all destinations * and (S, G) in this notation identifies a MDT with a source S and group of subscribers G which is some subset of "*". When unicast tunnels are incorporated in an equal cost multi-path (ECMP) network as components of MDT construction, multiple copies of the same multicast packet may transit a link for a given (S,G) MDT produced with basic IEEE 802.1aq (S,*) tiebreaking. Thus, these MDTs are not providing an optimal use of the bandwidth in the network and are adding complexity to the nodal implementation and would frequently require more overall state in the network than a more optimal MDT schema. An optimal solution would require that the shortest path tree for each MDT uniquely avoid this problem such that each MDT has the property that a replication point or leaf of the MDT does not have another replication point between itself and the replication point sending it traffic. The possibility of deployment of the solution as an interoperable distributed system would also entail an algorithm to permit nodes to independently compute a common result for every MDT in the network. Although the state reduction possibilities of utilizing unicast tunnels as a component of MDT construction is well suited to a software defined networking (SDN) separation of controller and forwarding elements, the algorithm for a distribution is needed to support non-SDN implementations and hybrid implementations.

Producing a perfectly minimum cost shortest path tree to an arbitrary subset of leaves on a graph is a computationally hard problem. To compute the tree, each node needs to start such an exploration at the root to produce an authoritative answer, which requires each node downstream of the root to explore its subset of the tree and ultimately roll up to decisions. To reduce the complexity of the construction of the multicast distribution trees, the embodiments utilize a process that produces a simplified graph of only the potential components of a given S,G tree. The process performs a series of graph pruning operations to simplify the topology of the S,* tree and personalize it for the individual set of recipients in the group. The graph pruning is repeated until either the tree is fully determined, or no further pruning according to the rules of the algorithm can be performed. Any S,G tree that is fully resolved after the iterative pruning process, where all leaves have a unique shortest path to the root, can be considered to be fully resolved as it will have the correct properties.

For any S,G that has not been fully resolved after the iterative process completes, where all leaves have a unique shortest path to the root, additional pruning operations known to have a high probability of producing a tree of the desired properties can be applied, but it may be necessary to check the result, and possibly execute corrections to preserve the properties that are sought including the property that no leaf or replication point exists on the set of shortest paths between a leaf or replication point and the node it receives traffic from.

In some embodiments, additional information is used in the pruning process for selecting shortest path trees. To implement the processes of the embodiments, there are metrics associated with each adjacency that are utilized for pruning that are extracted from the routing database. These metrics are the potential served leaf (PSL) count, and the potential served leaf list.

The PSL count for an adjacency is the number of leaves in G that are on the shortest path from S at a given point in the pruning process. The PSL list for an adjacency is the list of actual leaves enumerated by the PSL count. These metrics can be determined by traversing the shortest path (including all multi-path variations) back from each leaf towards the root, and recording the adjacencies traversed in the process. The PSL count and PSL list are kept up to date during the pruning process and act as a continuous input into the pruning decisions.

The pruning process can be expressed in pseudocode as follows:

```
For each source node (S) in network (N):
    Compute the shortest path without tie breaking rooted on S
    For each G for which S is a source:
        Determine the PSL metrics for each adjacency on the shortest path
        Construct the S,G graph which only includes the root, the leaves and any
            candidate replication points (tunnels will be employed as the
```

-continued

```
                interconnect)
        If the computing node does not appear in the S,G graph, then terminate
                    processing of this S,G - (These computing nodes will not have to
                    install state for this tree)
        (There are three types of pruning performed on the S,G graph, which can be performed
in any order and can be repeated until no more prunes are possible)
        Else
            Do
                Eliminate non-leaf non-candidate replication points
                Eliminate triangles
                Leaf and Pseudo Leaf pruning
            Until no further prunes are possible continue Do loop
        Note that any candidate replication nodes that lose their status (reverting to simply
transit as a result of pruning) are eliminated from the S,G graph
            If S,G fully resolved (all leaves have a unique path to the root in the pruned
graph) install state, then proceed to next G for which S is a source
            Else
                while current S,G trees not fully resolved
                    Find the closest node to the root with multiple uplinks, if more than one,
                        select the one with the lowest node ID
                    Of the set of uplinks, select the one where the next uplink has the highest
                        PSL count (again if a tie, choose the one from the tied set
                        with the lowest node ID). Prune the other uplinks.
                    Repeat the normal pruning
                Endwhile
                check that there are no replication points or leaves on the S,* shortest path
                    between each node on the S,G graph and it's upstream adjacency
                    (there should be only one at this point), if there is, replace the
                    current upstream adjacency with one connected to the closer
                    replication point or leaf (in a further embodiment, those leaves
                    that had a unique path to the root after normal pruning do not
                    need to be checked)
            Endif
        Endif
    Next G
Next S
End Pseudocode
```

It is worth noting that once all possible prunes have been performed and the tree is still unresolved, the step taken in pruning can be considered exemplary as it empirically generated good results, and other non-authoritative prunes could be considered.

The network illustrated in FIG. 1 is an example network topology with nodes 1-15 where the node 1 is a root of a multicast group. After the MDT computation steps are completed for this multicast group, a complete simplified graph of the network topology is generated. The simplification was performed using a set of "safe" processes and rules to prune links and nodes, as described above. As a result of the process the MDT is fully resolved, and it is a minimum cost tree so there will not be any duplicate packets on links in the presence of ECMP forwarding. The nodes that remain in this simplified graph are nodes 1, 5, 11, 12, 8, 4, and 13. These nodes need to install the requisite state for forwarding data traffic for the multicast group from the source node 1 to each of the leaves that the multicast group serves, namely nodes 4, 8, 11 and 13. The dotted lines of the diagram overlay the simplified graph of the computed MDT onto the original network topology graph.

Thus, the process set forth above provides an improved and more efficient method for generating and resolving efficient MDTs. This process is an implementation of the realization that it is not necessary to find complete connectivity, just the key nodes in a multicast tree. The embodiments make use of metrics that allow when leaves have a unique path to the root in a pruned graph to be detected. MDTs successfully resolved via the simple pruning rules require no further checking. However, the resulting MDTs are susceptible to lost and redundant multicast group traffic when there is a change in membership of the multicast group. The embodiments present a process that is applicable to mitigate this issue in MDTs such as those produced by the process above as well as similar processes that produce MDTs that can be disrupted by changes in membership.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
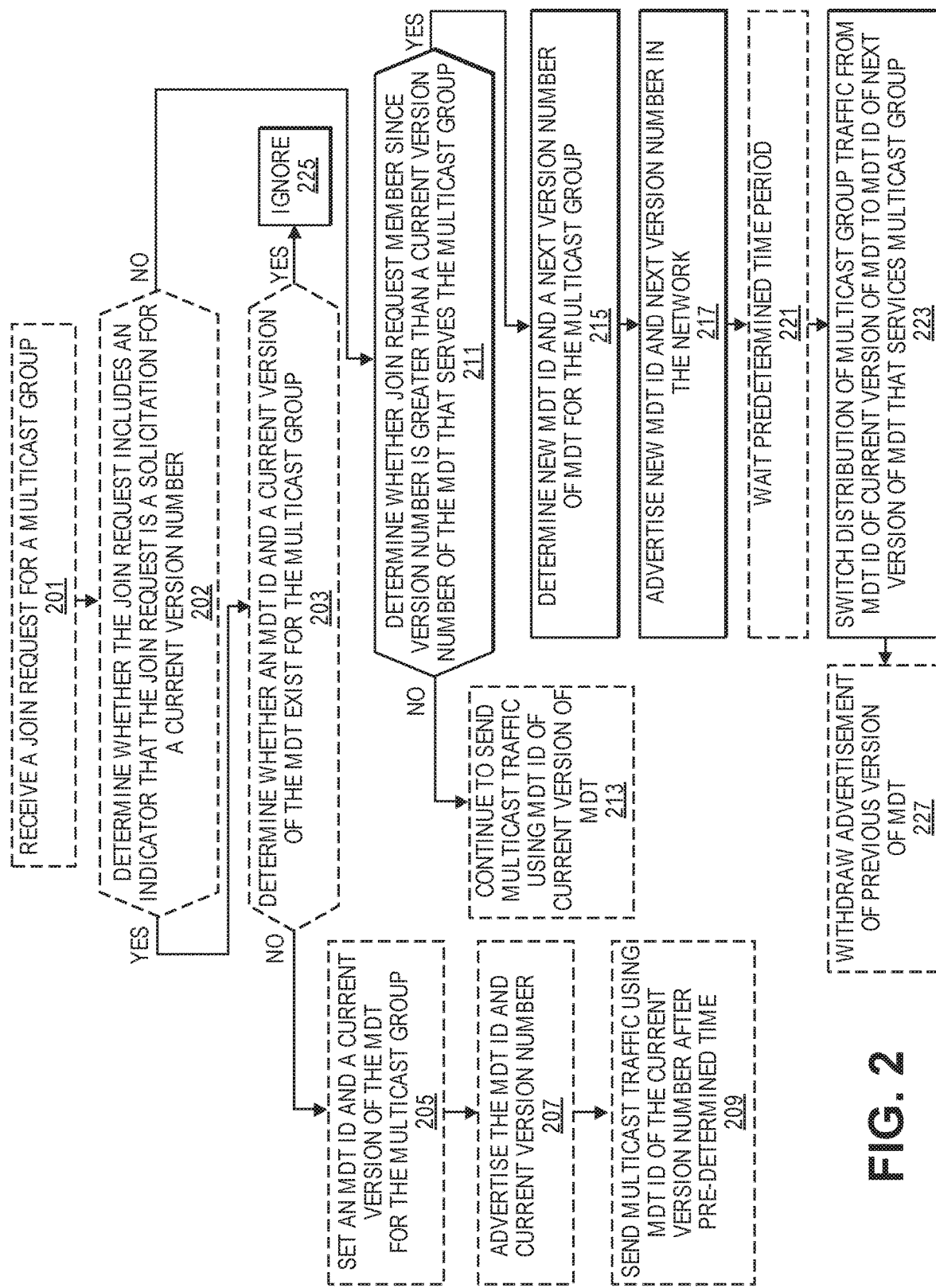
FIG. 2 is a flowchart of one embodiment of a process of a root of an MDT that services a multicast group to update the MDT to register a join.

FIG. 2 is a flowchart of one embodiment of a process of a root of an MDT that services a multicast group to update the MDT to register a join. The process of managing multicast group subscriptions in the network is distributed across the root, leaves, and all intermediate nodes. The process can be centrally controlled or controlled in a distributed fashion. In a centrally controlled implementation all state for a multicast group including the state to implement an MDT for the multicast group is managed at a central controller and installed at the relevant participating nodes. For example, the controller may be an SR controller in an interior gateway protocol (IGP) area.

In the distributed control implementation, individual nodes in a network compute their roles in the MDTs for the multicast groups in the network based upon topology information (e.g., in their respective link state databases), knowledge of the MDT roots and multicast registrations (joins and leaves) communicated in the network, e.g., via the IGP. The embodiments described herein below relate primarily to a distributed control implementation. In the distributed implementation the MDTs for each multicast group are associated with version numbers. Root advertisements and receiver registrations (joins/leaves) are augmented with version number information. This version number information for registrations can be in the form of specifying 'member since' and 'member until' where each of these values are version numbers of an MDT for a multicast group. Similarly, the source of a multicast group or the root of the MDT can advertise the multicast group with additional information including a SID for a specific version of an MDT as well as a version number for an MDT. This permits a "make before break" paradigm to be applied to MDT construction.

For example, where there is the multicast group 'x' that receivers ask to join or leave, the join or leave will identify the multicast group, typically in the form of an Internet Protocol (IP) version 4 (IPv4) or IPv6 multicast address and possibly a source. There can be (S,G) or (*,G) join/leaves. The multicast group has at least one MDT that is associated with it. The MDT has a version number. The MDT also has an MDT ID which is the corresponding dataplane identifier for the current version of the MDT. For SPRING networks, the MDT can be a multicast SID. The MDT ID can be chosen arbitrarily so long as there is some commonly understood dataplane mapping of the MDT ID into the forwarding plane. In one embodiment, multicast SIDs are utilized that are drawn from the SPRING Segment Routing Global Block (SRGB). The SRGB is a range of labels reserved for global SIDs in an SR domain.

In this example with the multicast group 'x,' a leaf of a multicast group will see an advertisement from the root for multicast group 'x', with MDT ID 'f', and version '3', where MDT ID 'f' corresponds to the dataplane instantiation of version '3'. A leaf that requests to join the multicast group 'x' includes multicast group 'x', member since version '4', member until 'unspecified' in the join request, where an 'unspecified' value is an explicit reserved value such as zero. The root will choose a new MDT ID for version '4' (e.g., 'q') and advertise the multicast group as group 'x', MDT ID 'q', version '4'. Intermediate nodes treat both version 3 and version 4 as distinct trees and maintain the state for version 3 as it is unchanged, and install the requisite state for version 4, the membership of each version being established by examining the member since and member until values of the receiver registrations. For a period of time both version 3 and version 4 will exist as distinct trees in the network with version 3 being 'live' and version 4 stabilizing, until the root decides version 4 is stable and switches multicast traffic for the multicast group 'x' from the MDT for version 3 to the MDT for version 4. The decision to switch may be based upon elapsed time or on other criteria. The root then withdraws the advertisement for the MDT with version '3'. At that point all state for MDT ID 'f' will be removed by the intermediate nodes in the network as the root advertisement for version 'f' no longer exists in the link state database. 'Withdrawing' the advertisement, as used herein, indicates that the removal of the information about the previous MDT is to be promulgated to the other nodes. The root may delete the previous version of the MDT from a local IGP database, which is then synchronized across the set of IGP speakers in the network, each of which updates its own local IGP database and identifies that the previous version of the MDT has been removed based on the deleted previous MDT ID. This causes the nodes to remove the state of the previous MDT.

In the embodiments, participating nodes are well behaved, and the usage of member since and member until version values in the messaging by nodes will follow a consistent set of processes described further herein below. The processes can be considered to fall into three groups. In a first group, the first node that to joins a multicast group will encounter a situation where there is no advertised MDT version, and therefore the node can solicit a version number using a registration or join request that identifies the multicast group and in which both the member since field and the member until field are unspecified. As above, 'unspecified,' in this context indicates that a specific reserved value is utilized such as zero. In a second group, a node sends a join request to a multicast group and sets the member since field to one greater than the highest advertised version that has been advertised by the root for the multicast group. The member until field is set to an unspecified value (e.g., indicating forever by using a maximum value or zero). In a third group, node sends a leave request to a multicast group by setting the member until field in the leave request to the highest MDT version currently advertised by the root. Those of ordinary skill in the art would understand that race conditions and malicious or incompetent implementations may not follow these conventions and procedures to compensate for these issues can be introduced. However, the example embodiments present cases where the processes are properly implemented for sake of clarity and conciseness.

It is possible to dimension (i.e., define a range for) the version number such that it is substantially larger than the operational changes an MDT can be expected to have during the course of its service lifetime. However, in some embodiments procedures can be implemented to permit the version number value to wrap around such that when a maximum version number is reached, the value will coherently 'increment' to a minimum value while still being understood to be higher than the previous version.

In one embodiment, the process at the root can be initiated by receiving a join request for a multicast group (e.g., multicast group 'x'). The join request includes a version number of the MDT that services the multicast group (Block 201), or more specifically a 'member since' version number that indicates the version number that the joining node is seeking to be included in. A member until version number can also be included in the join request. In some embodiments, a node seeking to join a multicast group can separately request a current version number of a multicast group rather than utilize a join request.

The root upon receiving the join request determines whether the join request or similar type of message includes an indicator that the request is a solicitation to obtain the current version number (Block 202). In a join request an 'unspecified' value can be placed in the member since field, e.g., a zero value, to indicate a solicitation. Where a separate message type is used, then the message type can be identified to determine that a solicitation has been received.

If the received request is a solicitation, then the root determines whether an MDT ID and a MDT with a current version number is already being advertised for the multicast group (Block 203). If an MDT exists along with a current version number and a solicitation request has been received, then the solicitation request can be ignored (Block 225). If the root has already advertised the multicast group, then the assumption is that the node sending the request has not yet received it due to race conditions and the advertisement does not need to be resent by the root. In a case where the requested multicast group does not have an advertised version for the multicast group, then the root sets an MDT ID, and a current version number for the multicast group (Block 205). The MDT to be computed for the MDT ID will serve all leaves that have joined the multicast group with a member since version number equal to or less than a current MDT version number and a member until field greater than or equal to the current MDT version number. Where the join request is a first join request for the multicast group, the MDT will include the single joining leaf node. The MDT ID can be any type of multicast forwarding dataplane identifier depending on the type of the network implementing the multicast group. For example, a SPRING network utilizes the multicast SID as the MDT ID. The root can then advertise the multicast group, and the MDT ID along with a current version number (Block 207). Multicast traffic can then be distributed by the root to the leaves served by the computed MDT with a current version number by using the MDT ID (Block 209). In the case where a first MDT has been computed for the multicast group in response to the join, the multicast traffic can be distributed after a pre-determined time period that enables the nodes in the network to compute the new MDT for the current version number.

In a case where the join indicates a member since version number of a multicast group when there is an existing MDT advertisement having a current version number, then the root determines whether the requested member since version number is greater than a current version number of the MDT that serves the multicast group (Block 211). In some embodiments, the process also checks to ensure that the member until version number is greater than the current version number. An MDT with a current version number is the MDT by which multicast traffic is currently being distributed for a multicast group. If the member since version number of the MDT in the join request is equal to or less than the current version number of the MDT servicing the multicast group, then the join request can be ignored as being untimely or with an assumption that the node seeking to join is already being serviced by the MDT with the current version number. In this case, the root continues to send multicast group traffic according to the MDT with the current version number to service the multicast group (Block 213).

In a case where the member since version number for an MDT for the multicast group in the join request is greater than a currently advertised version number of the MDT that serves the multicast group, then the process can determine a new MDT ID and a next version number for the multicast group (Block 215). The root can then advertise the new MDT for the multicast group with an incremented version number and a new MDT ID (Block 217). The version number of the new MDT can be incremented by a specific amount (e.g., by 1) or can be incremented to match the member since version number of the join. In some embodiments, a member since version number that is more than a next increment of the current version number is ignored as improper. The new computed MDT includes all nodes that have registered an interested (e.g., by sending a join request) for a member since version number that is equal to or less than the version number of the new MDT, except any nodes that have registered a leave for the new MDT via modifying their registration to indicate member until the current version number or less. The advertisement of the new MDT by the root begins a transition period as the nodes of the network generate state for the new MDT in anticipation of receiving multicast group traffic via the new MDT with the new version number and new MDT ID.

The transition period can be a pre-determined time length that enables the nodes of the network to receive the advertisement of the new version number and MDT ID for the multicast group (Block 221) and compute any state they need to install to instantiate the new MDT for the new MDT ID. In addition, the transition period can be of sufficient duration to enable the participating nodes to locally compute the new MDT and associate it with the new version number and MDT ID. At the end of the transition period, the root switches distribution of multicast group traffic from a current version of the MDT to the new or next version of the MDT that has been computed to service the multicast group (Block 223). After this point the new MDT and its version number are considered the current MDT and current version number for the multicast group. The root will then withdraw the advertisement for the previous MDT (Block 227).

Figure 3:
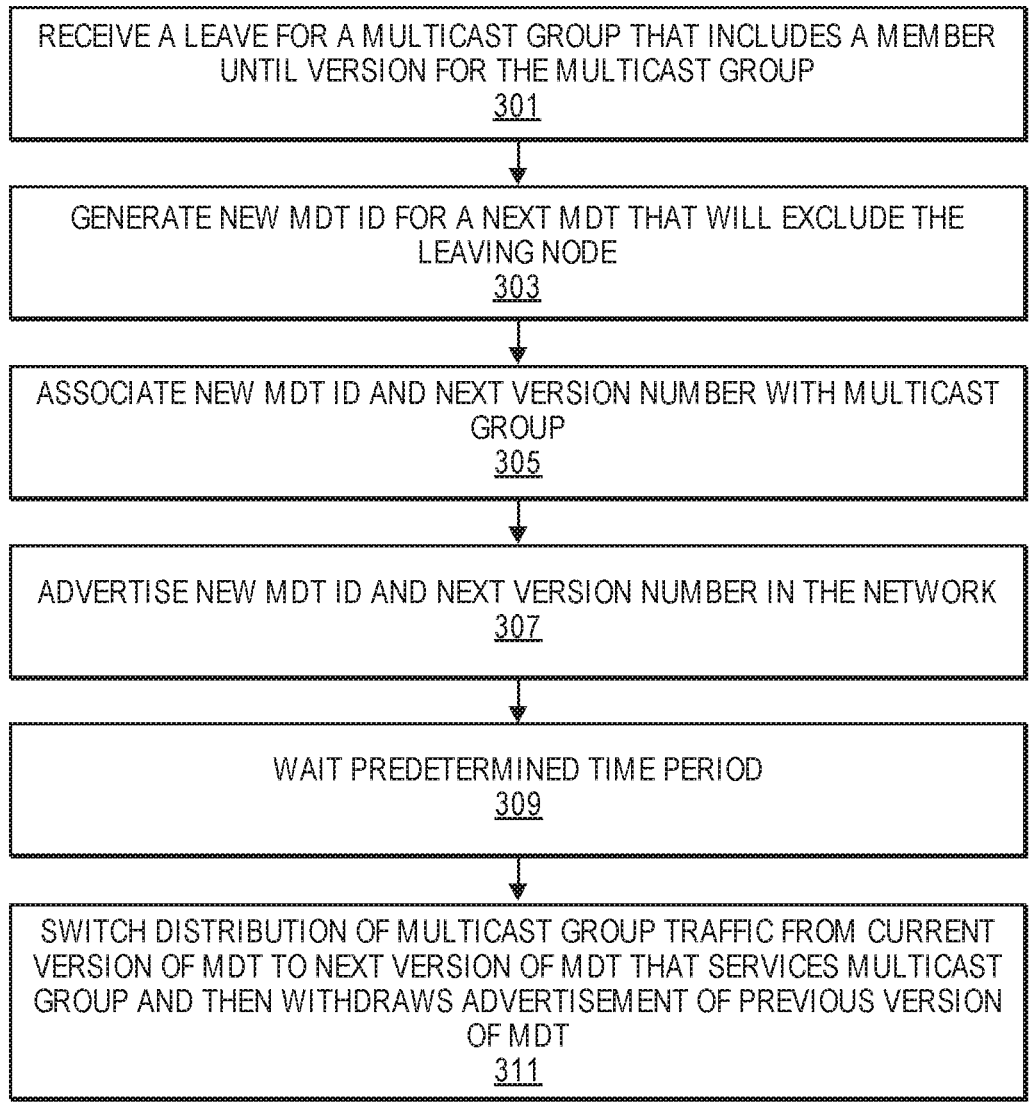
FIG. 3 is a flowchart of one embodiment of a process of a root of an MDT that services a multicast group to update the MDT to register a leave.

FIG. 3 is a flowchart of one embodiment of a process of a root of an MDT that services a multicast group to update the MDT to cease delivery of traffic to a node that has registered a desire to leave the MDT. The process at the root for handling of a leave is initiated in response to receiving a leave request for a multicast group (Block 301). The leave request identifies the multicast group (e.g., by an IPv4 or IPv6 address) and includes a member until version number for the MDT that indicates the version number of the MDT is the last version number of the MDT for which the leaf wishes to be included. By convention, the leave version number should be the same as the current version number. In some embodiments, a check may be implemented to detect leave version numbers that are less than or greater than the current version number, in which case these leaves are ignored by the root. This process ensures that a leave will also observe a make before break paradigm, the leaving node indicating a new MDT that will not include that leaf is required to be advertised by the root.

The root generates a new MDT-ID for the multicast group (Block 303). The root updates a current version number for the new MDT to a next increment, where the new MDT will provide service to all receiving nodes that have registered an interest in the next version (i.e., the nodes that send a join request that included a member since value that is less than or equal to the next increment, along with a member until value that is unspecified). The new MDT ID and the new or next incremented version number are associated with the multicast group and advertised along with the new MDT ID (Block 305). As mentioned, the current version number can be incremented to a next version number in a sequence (e.g., an increment of 1). The MDT ID is native to the network technology such as a multicast SID for SPRING networks that may be drawn from the SRGB.

The root then advertises the new MDT for the multicast group by advertising the new MDT ID and the new version number (Block 307). This begins a transition period as the nodes of the network generate state for the new MDT in anticipation of receiving multicast group traffic via the new MDT with the new version number and new MDT ID.

The transition period can be a pre-determined time length or based on other criteria that enables the nodes of the network to receive the advertisement of the new version number and MDT ID for the multicast group, process it and install state accordingly (Block 309). At the end of the transition period, the root switches distribution of multicast group traffic from a current version of the MDT to the new or next version of the MDT serving the multicast group (Block 311). After this point the new MDT and its version number are considered the current MDT and current version number for the multicast group, and the advertisement for the now previous version of the MDT is withdrawn by the root.

Figure 4:
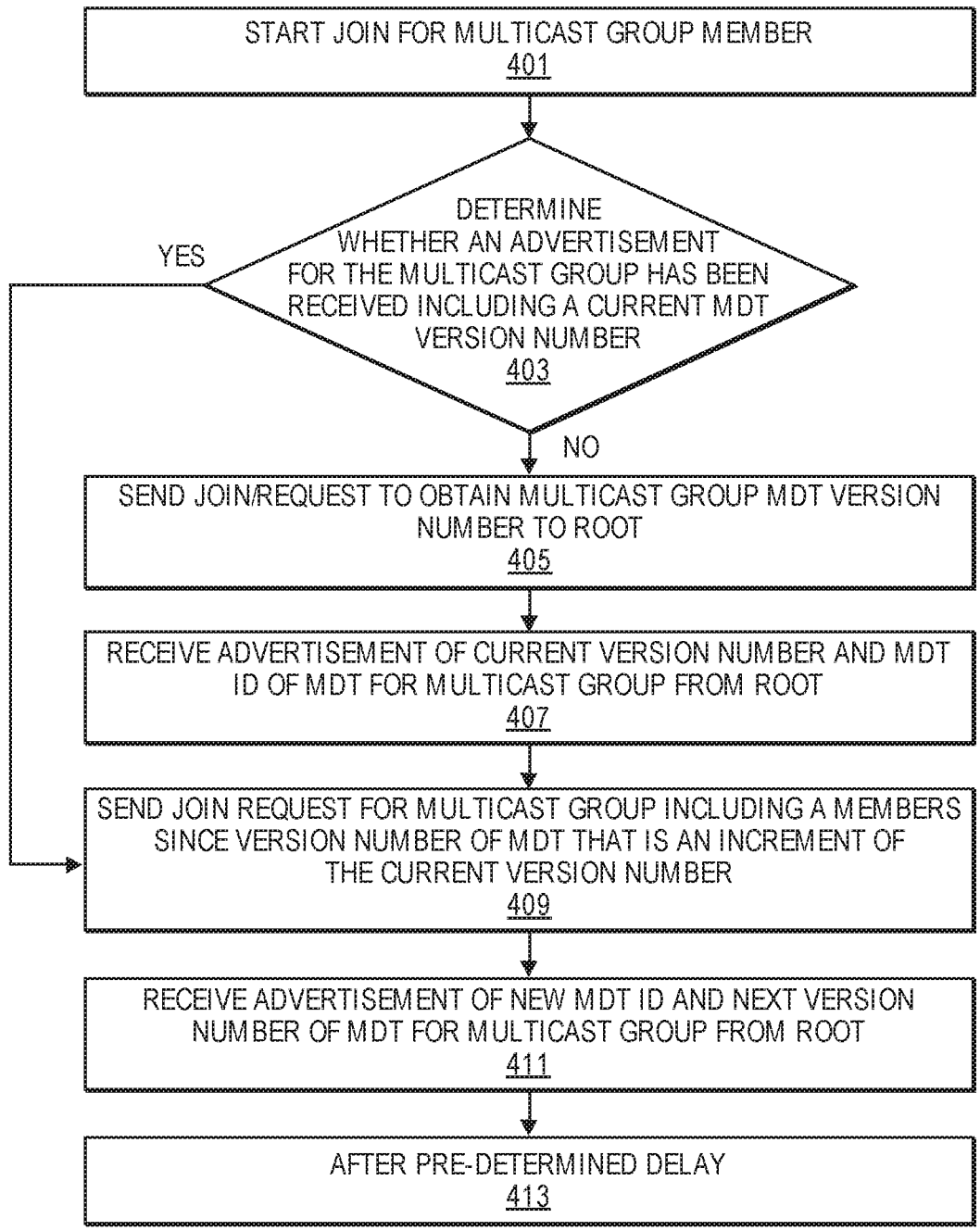
FIG. 4 is a flowchart of one embodiment of a process of a leaf of an MDT that services a multicast group to initiate a join to the multicast group.

FIG. 4 is a flowchart of one embodiment of a process of a leaf of an MDT that services a multicast group to initiate a join to the multicast group. The leaf node may be configured, self-determine or otherwise configured to be added to a multicast group, which initiates a process of joining the multicast group (Block 401). The configuration includes an identifier for the multicast group, which can be utilized to search a link state database or similar information to determine whether a current MDT version number is known for the multicast group (Block 403). If the local information does not provide a current version number for an MDT that services the multicast group, then a join or specialized request is sent to the root of the multicast group or flooded in the IGP using the multicast group address to obtain the current version number of the MDT that is servicing the multicast group (Block 405). In response, the root will advertise a current version number and MDT ID for the multicast group (Block 407). This information can then be added to the local databases such as the local link state database.

With the current version number of the MDT servicing the multicast group, the implementing leaf node can register an interest in the multicast group by sending a join request to the multicast group address (Block 409). The join request includes a member since version number that is greater than the current version number, for example a next increment of the current version number. In some embodiments, when the leaf cannot determine a current version number, the join request includes a member until value that is unspecified which is the case where the leaf is the first to join the group, hence no MDT exists. The implementing leaf node then awaits the advertisement of the multicast group from the root with the new MDT version number and MDT ID, which indicates a transition to an MDT including the implementing leaf node. When the implementing node receives an advertisement from the root of a new MDT version number with a new MDT ID, then a transition period begins from the current MDT to the new MDT (Block 411). In some embodiments, when the leaf is the first to join, in the interim period multicast group traffic may be tunneled by the root to the specific leaf until the transition period ends. After the root switches traffic from the old to the new MDT with the new version number servicing the multicast group, the leaf node will begin to receive the multicast group traffic (Block 413).

Figure 5:
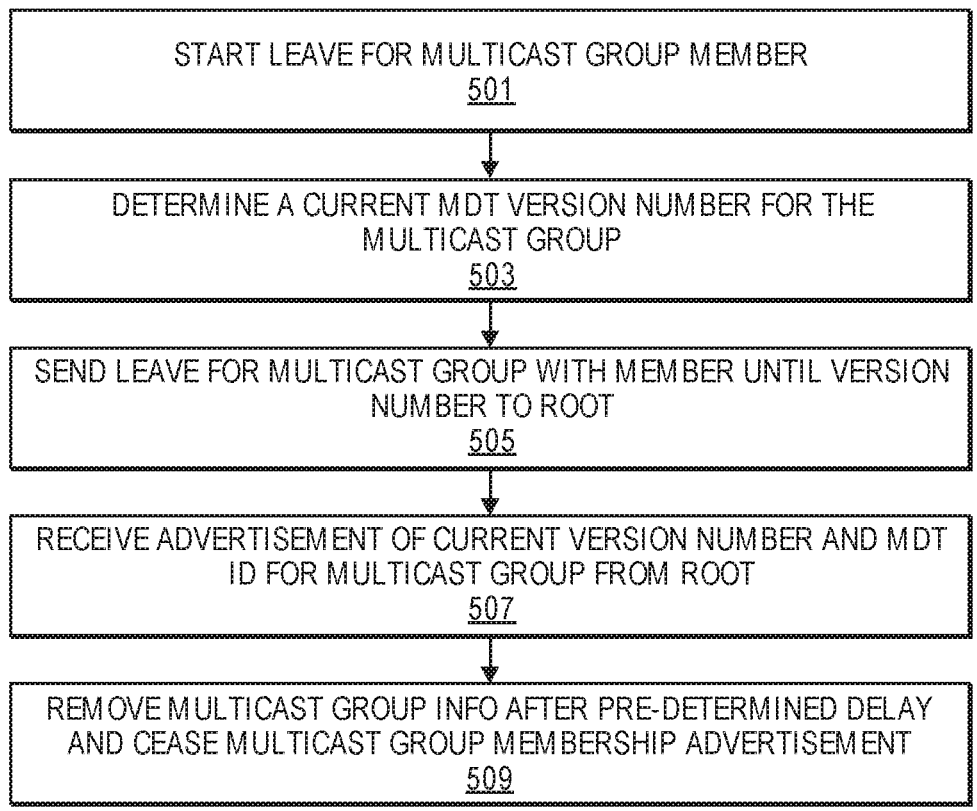
FIG. 5 is a flowchart of one embodiment of a process of a leaf of an MDT that services a multicast group to initiate a leave for the multicast group.

FIG. 5 is a flowchart of one embodiment of a process of a leaf of an MDT that services a multicast group to initiate a leave for the multicast group. The leaf node may be configured, self-determined or otherwise configured to leave a multicast group, which initiates a process of leaving the multicast group (Block 501). The configuration includes an identifier for the multicast group, which can be utilized to search a link state database or similar information to determine a current MDT version number for the multicast group (Block 503).

With the current version number of the MDT servicing the multicast group, the implementing leaf node can leave the multicast group by sending a leave request to the multicast group address (Block 505). The leave request includes a member until version number that is equal to the current version number indicating that a new version that excludes the leaf is required. The root will select a new MDT-ID for the multicast group and advertise it as the current version for the multicast group, where the current version value is an increment of the current version number (e.g., an increase of 1). The leaving leaf receives this advertisement from the root (Block 507). After the root switches traffic to the new MDT with the new version number servicing the multicast group, the leaf will stop receiving traffic, and the root will withdraw the advertisement for the now previous version. The withdrawal of the advertisement for the previous version will trigger the network including the leaf node that registered a leave to remove any state or other information related to the previous version of MDT for the multicast group (Block 509) and for the leaf registering the leave to withdraw all registrations associated with membership to the multicast group.

Figure 6:
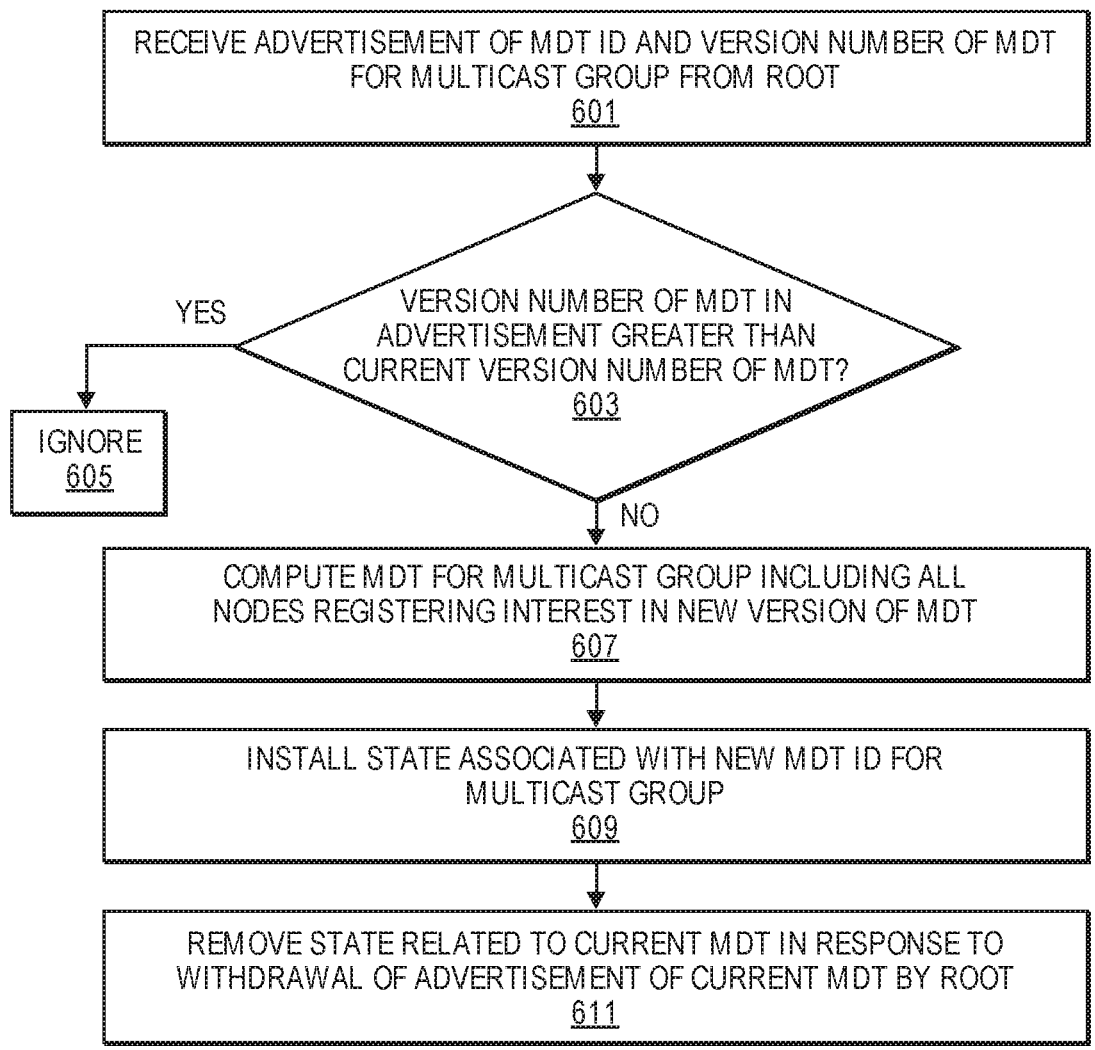
FIG. 6 is a flowchart of one embodiment of a process of a multicast group member to update to a new version of the MDT that services the multicast group.

FIG. 6 is a flowchart of one embodiment of a process of a multicast group member to update to a new version of the MDT that services the multicast group. The process describes the implementation by nodes in the network that are not the root or leaves that are leaving and joining. The other nodes in the network, in particular those that have a role in an MDT for a multicast group update their local information, such as their link state database as the version of an MDT change. In one embodiment, a node implementing the process can receive an advertisement from a root that includes the MDT ID and a version number of an MDT for a multicast group (Block 601). The implementing node determines whether the version number of the MDT exceeds a current version number of an MDT for the multicast group (Block 603). If the advertised version number is equal to or less than the current version number, then the advertisement is ignored as duplicate information (Block 605). If the advertised version number exceeds the current version number, then the node treats this as another MDT and computes the required local state for the advertised multicast group. The node determines the set of all nodes that have registered interest in the new version and excludes all nodes whose interest terminated with the current version when computing the local state to implement the new version of the MDT. (Block 607). The interests of the nodes in the network are registered via join and leave requests using member since and member until version values, which permits each computing node to accurately and independently determine the set of nodes associated with each version of the MDT. Thus, an MDT can be computed to include all nodes that have a member since value that is equal to or less than the new version number and the MDT can exclude nodes that have a member until value equal to the current version number.

When the implementing node receives an advertisement from the root of a new MDT version number with a new MDT ID, then a transition period begins from the current MDT to the new MDT. The implementing node begins to install state for the new MDT for the multicast group (Block 609). The root will perform a head end switch to complete the transition after a pre-determined time frame or based upon some other criteria. The pre-determined time frame can be a time that is sufficient for the advertisement to be distributed to the nodes, for the nodes to compute the new MDT and to install state for the new MDT.

After the switch of traffic to the new MDT with the new version number servicing the multicast group, the root will withdraw the advertisement for the now previous version of the MDT. At this point the leaf and implementing nodes will remove state for what was the current MDT (Block 611). After this transition completes, the new version MDT for the multicast group is considered to be the current version MDT of the multicast group.

Figure 7:
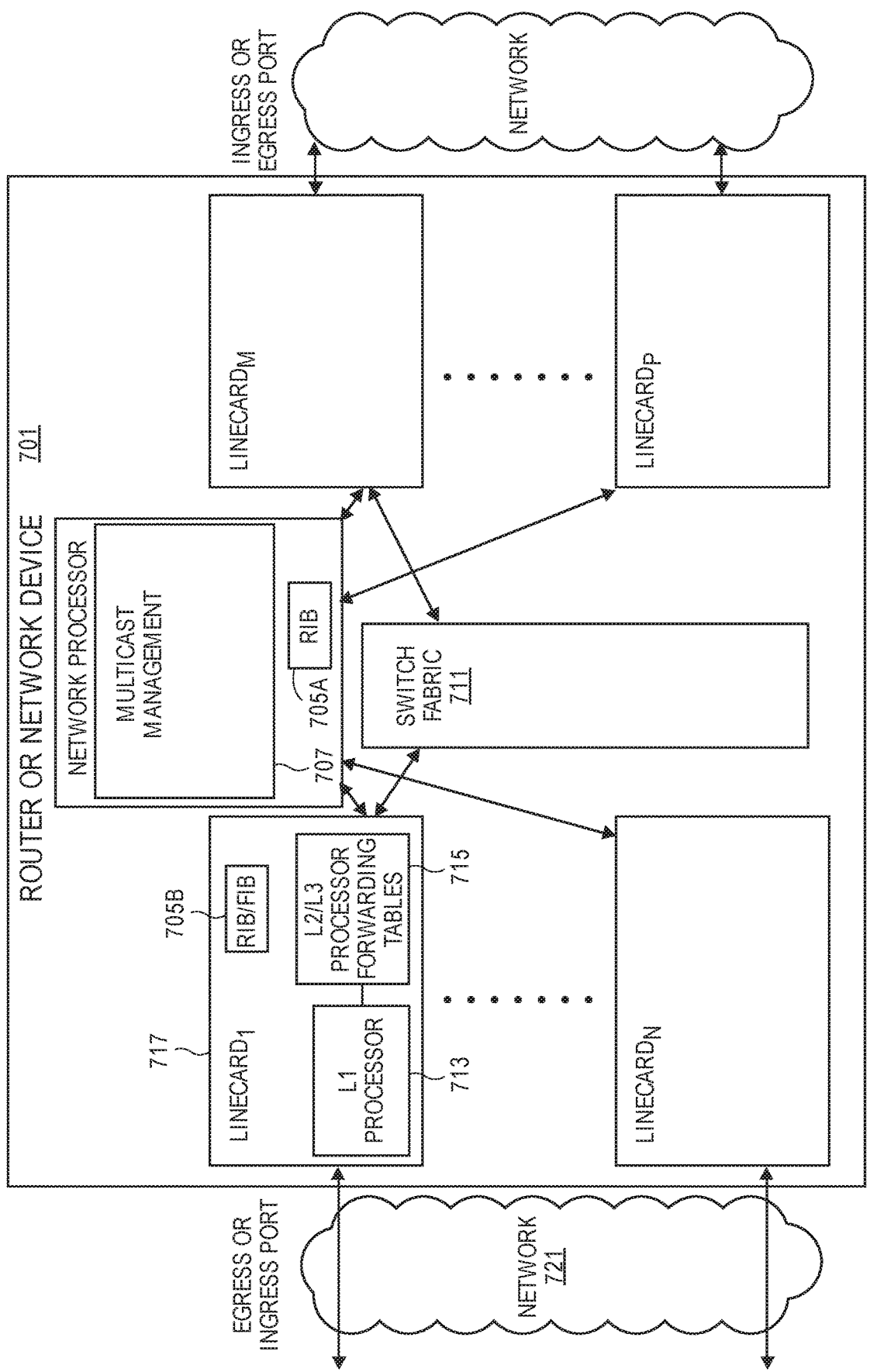
FIG. 7 is a diagram of one embodiment of a network device implementing a multicast manager that supports the MDT versioning process.

FIG. 7 is a diagram of one embodiment of the network device. In one embodiment, the determination and configuration of quick change IP channels is implemented by a network device 701 or similar computing device. The network device 701 can have any structure that enables it to receive data traffic (e.g., multicast data traffic) and forward it toward its destination. The network device 701 can include a network processor 703 or set of network processors that execute the functions of the network device 701. A 'set,' as used herein, is any positive whole number of items including one item. The network device 701 can execute a set of multicast manager 707 to implement the functions of managing multicast as described herein above where the network device 701 functions as a node in this network in the role of root, leaf or intermediate node via a network processor 703.

The network device 701 connects with separately administered networks that have user equipment and/or content servers. The network processor 703 can implement the multicast manager 707 as a discrete hardware, software module or any combination thereof. The network processor 703 can also service the routing information base 705A and similar functions related to data traffic forwarding and network topology maintenance. The routing information base 705A can be implemented as match action tables that are utilized for forwarding protocol data units PDUs (i.e. packets). The functions of the multicast manager 707 can be implemented as modules in any combination of software, including firmware, and hardware within the network device. The functions of the multicast manager 707 that are executed and implemented by the network device 701 include those described further herein above.

In one embodiment, the network device 701 can include a set of line cards 717 that process and forward the incoming data traffic toward the respective destination nodes by identifying the destination and forwarding the data traffic to the appropriate line card 717 having an egress port that leads to or toward the destination via a next hop. These line cards 717 can also implement the forwarding information base and/label forwarding base 705B, or a relevant subset thereof. The line cards 717 can also implement or facilitate the multicast manager 707 functions described herein above. The line cards 717 are in communication with one another via a switch fabric 711 and communicate with other nodes over attached networks 721 using Ethernet, fiber optic or similar communication links and media.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising a set of one or more processor(s) 812, forwarding resource(s) 814 (which typically include one or more ASICs and/or network processors), and physical network interfaces (NIs) 816 (through which network connections are made, such as those shown by the connectivity between NDs 800A-H), as well as non-transitory machine readable storage media 818 having stored therein networking software 820. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code which when executed by networking hardware 8, causes networking hardware 810 to perform operations of one or more embodiments of the present invention as part networking software instances 822. The software can include a multicast manager 833A that implements the functions described herein above in any of the roles of root, leaf, or intermediate node.

The special-purpose network device 802 is often physically and/or logically considered to include: 1) a ND control plane 824 (sometimes referred to as a control plane) comprising the processor(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the processor(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and physical NIs 846, as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the physical NI(s) 846, as well as optionally between the instances 862A-R; in addition, this virtual switch may enforce network isolation between the VNEs 860A-R that by policy are not permitted to communicate with each other (e.g., by honoring virtual local area networks (VLANs)).

Software 850 can include code which when executed by processor 842, causes the processor 842 to perform operations of one or more embodiments of the present invention as part networking software containers 862. The software 850 can include a multicast manager 864A-R implementing the processes described herein above.

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
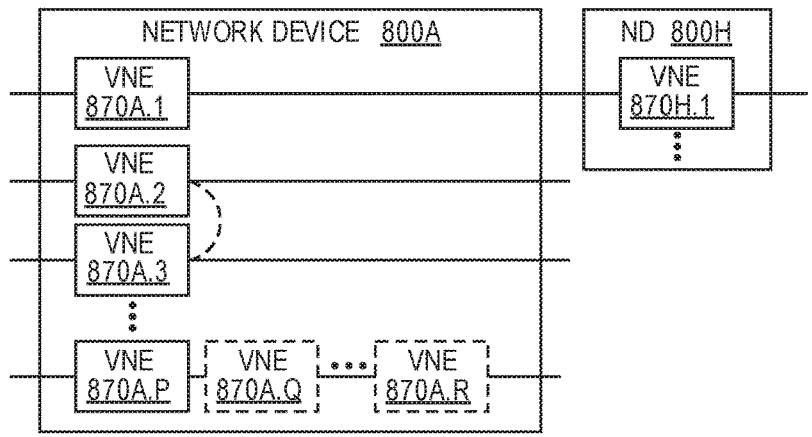
FIG. 8C illustrates various exemplary ways in which virtual network elements (VNEs) may be coupled according to some embodiments of the invention.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the processor(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
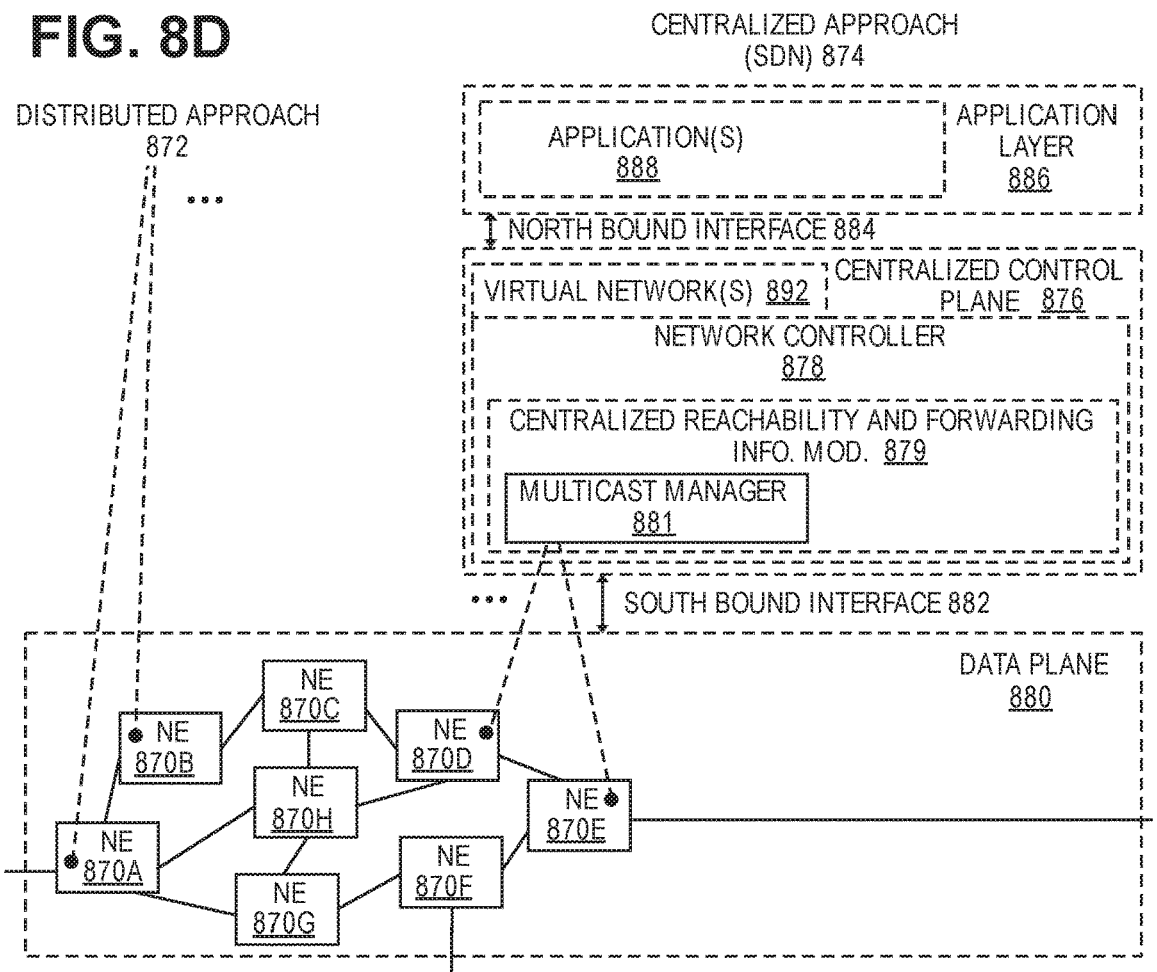
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE))

that communicate with other NEs to exchange routes, and then selects those routes based on one or more routing metrics. Thus, the NEs 870A-H (e.g., the processor(s) 812 executing the control communication and configuration module(s) 832A-R perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

In one embodiment, the centralized reachability and forwarding information module 879 may include a multicast manager 881 performing operations as described herein above.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the processor(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
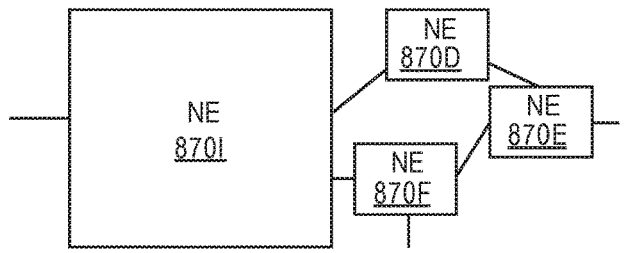
FIG. 8E illustrates the simple case of where each of the NDs implements a single NE, but a centralized control plane has abstracted multiple of the NEs in different NDs into (to represent) a single NE in one of the virtual network(s), according to some embodiments of the invention.
Figure 8F:
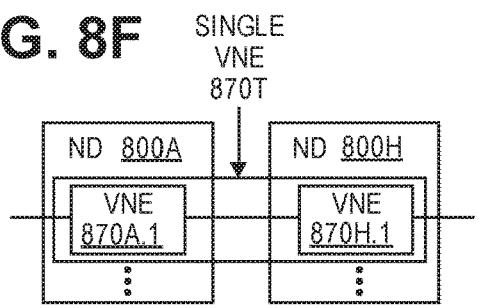
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
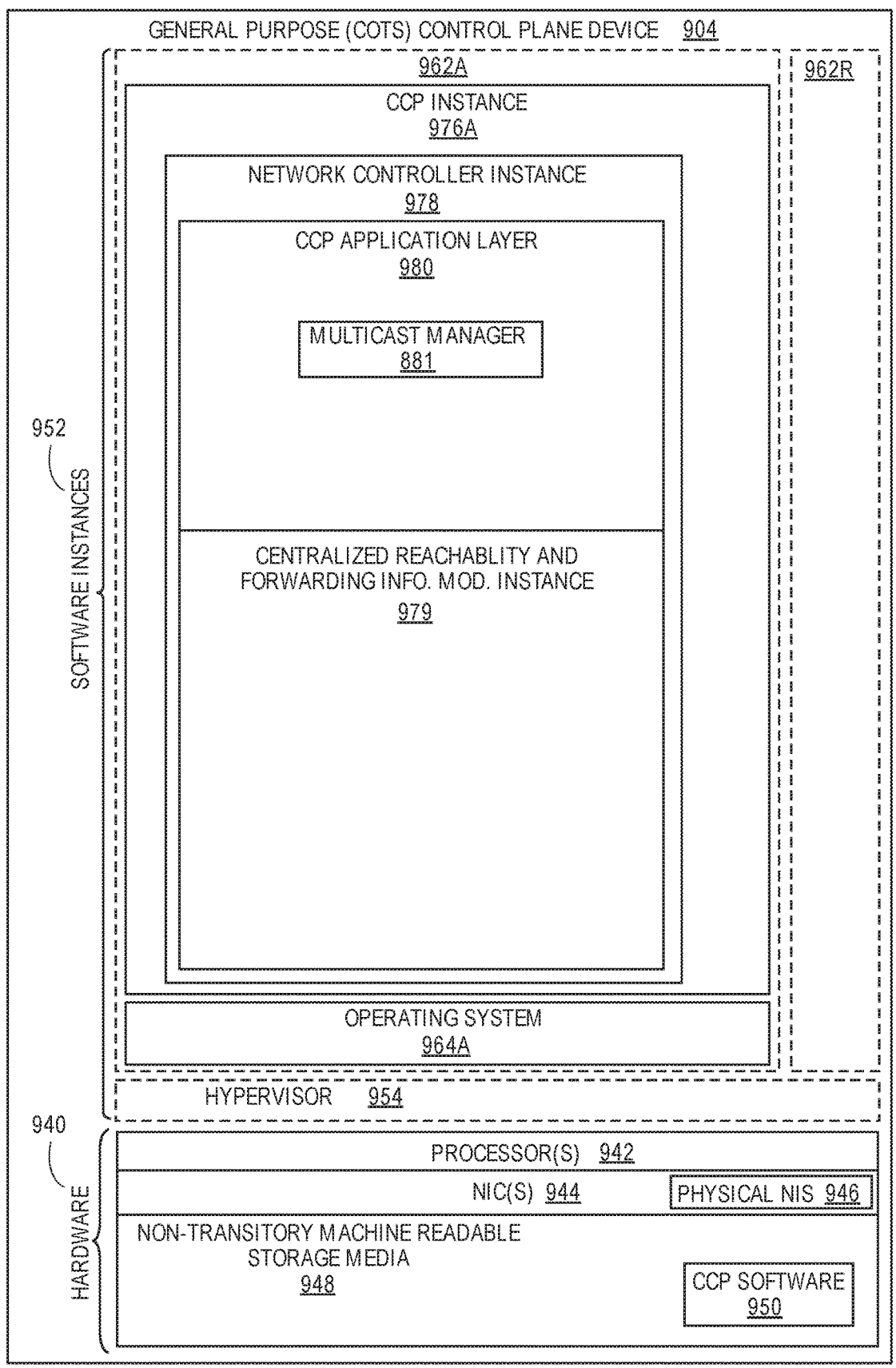
FIG. 9 illustrates a general purpose control plane device with centralized control plane (CCP) software 950), according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and physical NIs 946, as well as non-transitory machine readable storage media 948 having stored therein centralized control plane (CCP) software 950.

In one embodiment, the centralized reachability and forwarding information module 979 may include a multicast manager 881 performing operations as described herein above.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device to minimize multicast traffic loss or duplication in response to an update to multicast group membership in a network where multicast group membership changes can disrupt multicast traffic delivery to other members of the multicast group, the method comprising:
   receiving a registration for the multicast group including a member since version number that is greater than a current version number of a multicast distribution tree (MDT) that serves the multicast group or the registration for the multicast group including a member until version number that is less than or equal to the current version number of the MDT;
   advertising a new MDT identifier (ID) with a new version number for the MDT that serves the multicast group in the network; and
   switching distribution of multicast group traffic from the current version of the MDT that serves the multicast group to the new version of the MDT that serves the multicast group after a pre-determined time.

2. The method of claim 1 where the network is a source packet in routing networking (SPRING) network.

3. The method of claim 1, further comprising:
   tunneling multicast traffic of the multicast group to a joining node until such time as when a root switches the multicast traffic to the new MDT.

4. The method of claim 1, further comprising:
   advertising the current MDT ID and current version number of the MDT in response to a request from a node in the network without state information for the multicast group.

5. The method of claim 1, wherein the registration includes the member until and member since version numbers.

6. A network device configured to minimize multicast traffic loss or duplication in response to an update to multicast group membership in a network where multicast group membership changes can disrupt multicast traffic delivery to other members of the multicast group, the network device comprising:
- a non-transitory computer readable storage medium having stored therein a multicast manager; and
- a processor coupled to the non-transitory computer readable storage medium, the processor to execute the multicast manager, the multicast manager to receive a registration for the multicast group including a member since version number that is greater than a current version number of a multicast distribution tree (MDT) that serves the multicast group or the registration for the multicast group including a member until version number that is less than or equal to the current version number of the MDT, to advertise a new MDT identifier (ID) with a new version number for the MDT that serves the multicast group in the network, and to switch distribution of multicast group traffic from the current version of the MDT that serves the multicast group to the new version of the MDT that serves the multicast group after a pre-determined time.

7. The network device of claim 6 where the network is a source packet in routing networking (SPRING) network.

8. The network device of claim 6, wherein the multicast manager is further to tunnel multicast traffic of the multicast group to a joining node until such time as when a root switches the multicast traffic to the new MDT.

9. The network device of claim 6, wherein the multicast manager is further to advertise the current MDT ID and current version number of the MDT in response to a request from a node in the network without state information for the multicast group.

10. The network device of claim 6, wherein the registration includes the member until and member since version numbers.

11. A computing device in communication with a network device in a network with a plurality of network devices, the computing device to execute a plurality of virtual machines for implementing network function virtualization (NFV), wherein a virtual machine from the plurality of virtual machines is configured to minimize multicast traffic loss or duplication in response to an update to multicast group membership in a network where multicast group membership changes can disrupt multicast traffic delivery to other members of the multicast group, the computing device comprising:
- a non-transitory computer readable storage medium having stored therein a multicast manager; and
- a processor coupled to the non-transitory computer readable storage medium, the processor to execute the virtual machine from the plurality of virtual machines, the virtual machine to execute the multicast manager, the multicast manager to receive a registration for the multicast group including a member since version number that is greater than a current version number of a multicast distribution tree (MDT) that serves the multicast group or the registration for the multicast group including a member until version number that is less than or equal to the current version number of the MDT, to advertise a new MDT identifier (ID) with a new version number for the MDT that serves the multicast group in the network, and to switch distribution of multicast group traffic from the current version of the MDT that serves the multicast group to the new version of the MDT that serves the multicast group after a pre-determined time.

12. The computing device of claim 11 where the network is a source packet in routing networking (SPRING) network.

13. The computing device of claim 11, wherein the multicast manager is further to tunnel multicast traffic of the multicast group to a joining node until such time as when a root switches the multicast traffic to the new MDT.

14. The computing device of claim 11, wherein the multicast manager is further to advertise the current MDT ID and current version number of the MDT in response to a request from a node in the network without state information for the multicast group.

15. The computing device of claim 11, wherein the registration includes the member until and member since version numbers.

16. A control plane device is configured to implement a control plane of a software defined networking (SDN) network including a network device in a network with a plurality of network devices, wherein the control plane device is configured to minimize multicast traffic loss or duplication in response to an update to multicast group membership in a network where multicast group membership changes can disrupt multicast traffic delivery to other members of the multicast group, the control plane device comprising:
- a non-transitory computer readable storage medium having stored therein a multicast manager; and
- a processor coupled to the non-transitory computer readable storage medium, the processor to execute the multicast manager, the multicast manager to receive a registration for the multicast group including a member since version number that is greater than a current version number of a multicast distribution tree (MDT) that serves the multicast group or the registration for the multicast group including a member until version number that is less than or equal to the current version number of the MDT, to advertise a new MDT identifier (ID) with a new version number for the MDT that serves the multicast group in the network, and to switch distribution of multicast group traffic from the current version of the MDT that serves the multicast group to the new version of the MDT that serves the multicast group after a pre-determined time.

17. The control plane device of claim 16 where the network is a source packet in routing networking (SPRING) network.

18. The control plane device of claim 16, wherein the multicast manager is further to tunnel multicast traffic of the multicast group to a joining node until such time as when a root switches the multicast traffic to the new MDT.

19. The control plane device of claim 16, wherein the multicast manager is further to advertise the current MDT ID and current version number of the MDT in response to a request from a node in the network without state information for the multicast group.

20. The control plane device of claim 16, wherein the registration includes the member until and member since version numbers.

* * * * *